(12) United States Patent
Cho et al.

(10) Patent No.: US 8,397,071 B2
(45) Date of Patent: Mar. 12, 2013

(54) GENERATION METHOD AND UPDATE METHOD OF AUTHORIZATION KEY FOR MOBILE COMMUNICATION

(75) Inventors: Seok-Heon Cho, Daejeon (KR); Chul-Sik Yoon, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 704 days.

(21) Appl. No.: 12/480,521

(22) Filed: Jun. 8, 2009

(65) Prior Publication Data
US 2009/0240944 A1   Sep. 24, 2009

Related U.S. Application Data

(63) Continuation of application No. PCT/KR2007/006380, filed on Dec. 7, 2007.

(30) Foreign Application Priority Data

Dec. 8, 2006 (KR) .................. 10-2006-0124955
Oct. 11, 2007 (KR) .................. 10-2007-0102551

(51) Int. Cl.
*H04L 9/32* (2006.01)
*H04L 9/00* (2006.01)
(52) U.S. Cl. ......................................... 713/175; 380/45
(58) Field of Classification Search .................. 713/175; 380/45
See application file for complete search history.

(56) References Cited

U.S. PATENT DOCUMENTS

| 2003/0039361 A1* | 2/2003 | Hawkes et al. | 380/278 |
| 2003/0093680 A1* | 5/2003 | Astley et al. | 713/183 |
| 2004/0250092 A1* | 12/2004 | Hori et al. | 713/189 |
| 2006/0236106 A1* | 10/2006 | Patel | 713/169 |

FOREIGN PATENT DOCUMENTS

| KR | 1997-0031534 | 6/1997 |
| KR | 10-2006-0039564 | 5/2009 |

OTHER PUBLICATIONS

International Search Report & Written Opinion (Forms PCT/ISA/210 & PCT/ISA/237) for International Application No. PCT/KR2007/006380, mailed Apr. 7, 2008.

* cited by examiner

*Primary Examiner* — Peter Shaw
(74) *Attorney, Agent, or Firm* — Staas & Halsey LLP

(57) ABSTRACT

The present invention relates to an authorization key generating method and an authorization key updating method in a mobile communication system. A terminal and a base station generate an authorization key by using a terminal random value and a base station random value that are exchanged in an authorization key generating procedure as input data. In addition, a lifetime of an authorization key is established to be shorter than a lifetime of a root key, and the authorization key is updated with an updating period that is shorter than that of the root period.

14 Claims, 2 Drawing Sheets

【Figure 1】

GENERATION METHOD AND UPDATE METHOD OF AUTHORIZATION KEY FOR MOBILE COMMUNICATION

CROSS REFERENCE TO RELATED PATENT APPLICATIONS

This application is a continuation application filed under 35 U.S.C. §111(a), claiming the benefit under 35 U.S.C. §120 and §365(c) of PCT International Application No. PCT/KR2007/006380, filed Dec. 7, 2007, which claimed priority to Korean Patent Application No. 10-2006-0124955, filed Dec. 8, 2006, and Korean Patent Application No. 10-2007-0102551, filed Oct. 11, 2007 in the Korean Intellectual Property Office, the disclosures of all of which are hereby incorporated by reference.

TECHNICAL FIELD

The present invention relates to an authentication key generating method and an authorization key updating method in a mobile communication system.

This work was supported by the IT R&D program of MIC/IITA [2006-P10-03, WiBro Evolution Standardization Research].

BACKGROUND ART

In a mobile communication system that includes a wireless portable Internet service, terminal authorization and authentication are performed in order to safely provide a service. Through the terminal authorization and authentication, terminal device authentication or user authentication is successfully performed, and an authorization key is generated.

In a conventional mobile communication system, a root key shared in a base station and a terminal authorized to generate the authorization key is used as an input key, a media access control (MAC) address, a base station identifier, and a predetermined string are used, and the authorization key is generated. In addition, the generated authorization key is periodically updated, and device and user re-authentication is performed between the terminal and the base station when the key is updated. When the re-authentication is performed, the terminal and the base station use wireless link resources to exchange control messages.

The above information disclosed in this Background section is only for enhancement of understanding of the background of the invention and therefore it may contain information that does not form the prior art that is already known in this country to a person of ordinary skill in the art.

DISCLOSURE

[Technical Problem]

In addition, while stability for the authorization key is guaranteed as a lifetime of the authorization key is reduced, the re-authentication is frequently performed to generate the authorization key as the lifetime of the authorization key is reduced. Therefore, wireless link resources are wasted. However, when a period for performing the re-authentication is reduced to efficiently use the wireless link resources, the lifetime of the authorization key is increased, but safety of the authorization key is reduced.

[Technical Solution]

The present invention has been made in an effort to provide an authorization key generating method and an authorization key updating method for minimizing wireless link resource waste and increasing safety of an authorization key in a mobile communication system.

According to an exemplary embodiment of the present invention, in an authorization key generating method of a base-station, a root key is obtained in an authentication procedure with a terminal; a base station random value is generated; a first message including the base station random value is transmitted to the terminal; a second message including a terminal random value is received from the terminal; an authorization key is generated by using the root key, the base station random value, and the terminal random value; and a third message including a message authentication parameter that is generated by using a message authorization key corresponding to the authorization key is transmitted to the terminal.

According to another exemplary embodiment of the present invention, in an authorization key generating method of a terminal, a root key is obtained by performing an authentication procedure with a base station; a first message including a base station random value is received from the base station; a terminal random value is generated; an authorization key is generated by using the root key, the base station random value, and the terminal random value; a second message including the terminal random value is transmitted to the base station; and a third message that is a response to the second message is received.

According to a further exemplary embodiment of the present invention, in an authorization key updating method of a base station, a root key is obtained by performing an authentication procedure with a terminal, an authorization key is generated by using the root key, a lifetime of the authorization key is established to be shorter than a lifetime of the root key, and the authorization key is updated before the lifetime of the authorization key has expired.

According to a still further exemplary embodiment of the present invention, in an authorization key updating method of a base station, an authorization key is generated by using a root key, a first base station random value, and a first terminal random value; a first message including a second terminal random value is received from the terminal before a lifetime of the authorization key has expired; a second base station random value is generated; the authorization key is updated by using the root key, the second terminal random value, and the second base station random value; a second message including the second base station random value is transmitted to the terminal; and a third message that is a response to the second message is received.

According to a still yet further exemplary embodiment of the present invention, in an authorization key updating method of a terminal, an authorization key is generated by using a root key, a first base station random value, and a first terminal random value; a second terminal random value is generated; a first message including the second terminal random value is transmitted to a base station; a second message including a second base station random value is received from the base station; and the authorization key is updated by using the root key, the second base station random value, and the second terminal random value.

According to the exemplary embodiments of the present invention, since a terminal random value that is randomly generated by a terminal and a base station random value that is randomly generated by a base station are used to generate an authorization key, stability of the authorization key may be increased.

In addition, since a period for updating the authorization key is established to be shorter than a period for updating a root key, and the authorization key is updated without a re-authentication procedure, wireless link resources may not be wasted, and the stability of the authorization key may be increased.

[Advantageous Effects]

Since the lifetime of the authorization key and the lifetime of the root key are differently established, the safety of the authorization key may be increased, and the wireless link resources may be efficiently used.

BEST MODE

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise", and variations such as "comprises" and "comprising", will be understood to imply the inclusion of stated elements but not the exclusion of any other elements.

In the specification, a mobile station (MS) may refer to a terminal, a mobile terminal (MT), a subscriber station (SS), a portable subscriber station (PSS), a user equipment (UE) apparatus, an access terminal (AT), or the like. In addition, the mobile station may include all or some functions of the mobile terminal, the subscriber station, the portable subscriber station, the user equipment apparatus, or the like.

Further, a base station (BS) may refer to an access point (AP), a radio access station (RAS), a Node-B, a base transceiver station (BTS), an MMR-BS, or the like. The base station may include all or some functions of the access point, the radio access station, the Node-B, the base transceiver station, the MMR-BS, or the like.

Authorization key generating and updating methods in a mobile communication system according to an exemplary embodiment of the present invention will be described with reference to the figures.

Firstly, an authorization key generating method in a mobile communication system according to the exemplary embodiment of the present invention will be described with reference to FIG. 1.

Figure 1:
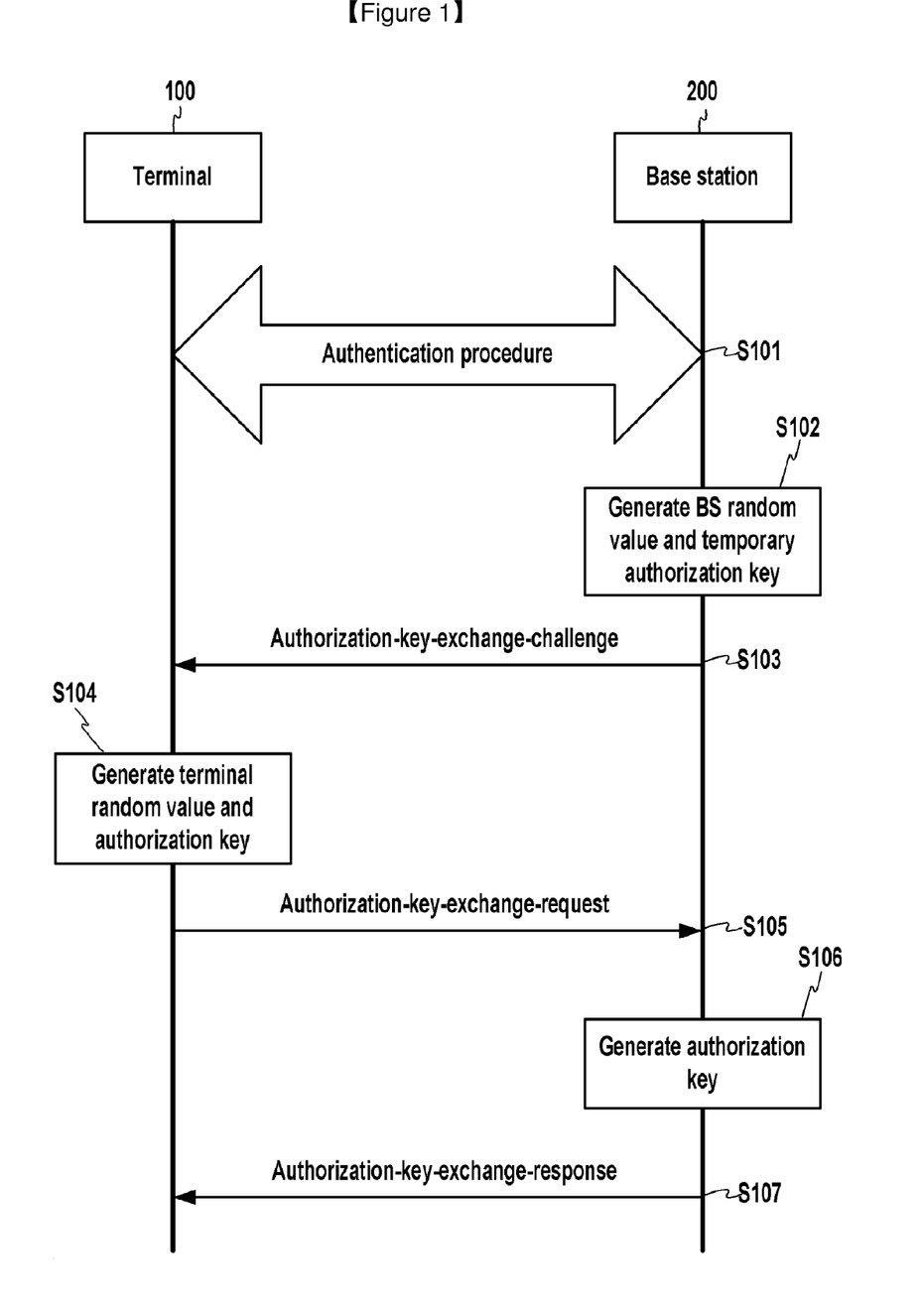
FIG. 1 is a flowchart representing an authorization key generating method in a mobile communication system according to an exemplary embodiment of the present invention.

FIG. 1 is a flowchart representing the authorization key generating method in the mobile communication system according to the exemplary embodiment of the present invention, and it illustrates an initial authorization key generating procedure after a terminal 100 and a base station 200 perform an initial authentication procedure or perform a re-authentication procedure.

Referring to FIG. 1, an authentication procedure is performed between the terminal 100 and the base station 200 to safely provide services to the terminal 100 in the mobile communication system in step S101. In this case, the authentication procedure is performed by a Rivest Shamir Adleman (RSA)-based authentication method for authenticating the terminal 100 and the base station 200 and an extensible authentication protocol (EAP)-based authentication method using a higher authentication protocol, and device and user authentication for the terminal 100 and the base station 200 may be performed by the authentication procedure. In addition, when the authentication procedure is successfully performed, a root key corresponding to the corresponding terminal 100 is generated, and the terminal 100 and the base station 200 share the generated root key.

When the authentication procedure is successfully performed and the terminal 100 is authorized, the terminal 100 and the base station 200 perform an initial authorization key generating procedure in steps S102 to S107.

To generate an authorization key, the base station 200 randomly generates a base station random value (BS Random). A root key corresponding to the corresponding terminal 100 is used as an input key, and the base station 200 generates a temporary authorization key (TAK) by using the base station random value (BS Random) randomly generated by the base station 200, a terminal MAC address used to identify the terminal 100, a base station identifier used to identify the base station 200, and a predetermined string as input data in step S102.

In addition, the generated temporary authorization key is used to generate a temporary message authentication key. Here, since the base station 200 does not know a terminal random value (SS Random) that is randomly generated by the terminal 100, the terminal random value is not included in the input data when the temporary authorization key is generated.

When the temporary authorization key is generated, the base station 200 transmits an authorization-key-exchange-challenge message to the terminal 100 in step S103.

Table 1 shows parameters in the authorization-key-exchange-challenge message according to the exemplary embodiment of the present invention.

TABLE 1

| Attribute | Contents |
| --- | --- |
| Root Key lifetime | Lifetime for new root key |
| Root Key sequence number | Sequence number for new root key |
| BS random | Random number generated by a BS. This attribute may be encrypted. |
| Key lifetime | Key remaining lifetime for new AK |
| Key sequence number | Key sequence number for new AK |
| AKID | AK identifier for new AK |
| CMAC-Digest | Message authentication digest calculated with temporary authentication keys derived from new TAK (Temporary Authorization Key) |

As shown in Table 1, the authorization-key-exchange-challenge message includes root key lifetime, root key sequence number, base station random value (BS Random), key lifetime, key sequence number, authorization key identifier (AKID), and Cipher-based message authentication code (CMAC) parameter (CMAC-Digest).

The root key lifetime is a lifetime of the root key, and the terminal 100 is required to request re-authentication from the base station 200 when the root key lifetime has expired.

The root key sequence number is used to identify the root key, and is used to identify two root keys when the re-authentication is performed. That is, the terminal 100 and the base station 200 perform the re-authentication before the root key lifetime has expired, and there may be two root keys for a predetermined time when the re-authentication is performed.

Accordingly, the terminal 100 or the base station 200 uses the root key sequence number to identify the two different root keys. In addition, the root key sequence number is generated by the base station 200, and the base station 200 uses the authorization-key-exchange-challenge message sent to the terminal 100 to share the root key sequence number.

The base station random value is randomly generated by the base station 200, and is used to generate the authorization key. In addition, the base station 200 may encrypt the base station random value and transmit it, and the base station 200 uses the temporary authorization key or a predetermined key that is generated by the temporary authorization key to encrypt the base station random value.

The key lifetime is a lifetime of a newly generated authorization key, and the terminal 100 is required to request the base station 200 to update the authorization key before the key lifetime has expired. Here, the lifetime of the authorization key is established to be shorter than the root key lifetime, and is independently managed from the root key. That is, while the root key is updated once by performing the re-authentication between the terminal 100 and the base station 200, the authorization key is updated several times. When the lifetime of the authorization key is established to be shorter than the root key lifetime as described, resources in a wireless link are prevented from being wasted, and the safety of the authorization key may be increased.

The key sequence number that is a sequence number of the temporary authorization key that is generated by the base station 200 is used to identify two temporary authorization keys shared by the terminal 100 and the base station 200 when the authorization key is updated. The terminal 100 and the base station 200 are required to update the authorization key before the lifetime of the authorization key has expired, and there may be two temporary authorization keys for a predetermined time when the authorization key is updated. Accordingly, the terminal 100 or the base station 200 uses the key sequence number to identify the two temporary authorization keys. In addition, since the temporary message authentication key is generated by using each temporary authorization key, two temporary message authentication keys may exist for a predetermined time. Accordingly, a sequence number of the temporary message authentication key is required to identify the two temporary message authentication keys, and a sequence number of the temporary authorization key is used as the sequence number of the temporary message authentication key.

In addition, a sequence number for the authorization key and a sequence number for a message authentication key that is generated by using the authorization key use the same value as the sequence number of the temporary authorization key.

The CMAC parameter is a parameter for authenticating the authorization-key-exchange-challenge message. The base station 200 generates the CMAC parameter by applying parameters (except for the CMAC parameter) in the authorization-key-exchange-challenge message to a message hash function by using the temporary message authentication key that is generated based on the temporary authorization key.

Referring to FIG. 1, the terminal 100 receiving the authorization-key-exchange-challenge message authenticates the authorization-key-exchange-challenge message. Here, the terminal 100 uses the CMAC parameter in the authorization-key-exchange-challenge message to perform the message authentication. That is, the terminal 100 generates the CMAC parameter by using the parameters in the authorization-key-exchange-challenge message except for the CMAC parameter. In addition, the terminal 100 uses a temporary message authentication key that is generated by the terminal 100 to generate the CMAC parameter. Accordingly, the terminal 100 uses the root key as the input key and uses the base station random value, the terminal MAC address, the base station identifier, and the predetermined string in the authorization-key-exchange-challenge message as the input data to generate the temporary authorization key, and generates the temporary message authentication key from the generated temporary authorization key. The terminal 100 compares the generated CMAC parameter and the CMAC parameter in the authorization-key-exchange-challenge message to authenticate the corresponding message.

When the authorization-key-exchange-challenge message has failed to be authenticated, the terminal 100 discards the corresponding message. In addition, when the authorization-key-exchange-challenge message is successful, the terminal 100 acknowledges that the base station 200 has the same root key, and generates a terminal random value (SS Random). In addition, the terminal 100 uses the root key as the input key and uses the base station random value, the terminal random value, the terminal MAC address, the base station identifier, and the predetermined string as the input data to generate an authorization key (AK) in step S104. In addition, the terminal 100 uses the generated authorization key to generate a message authentication key. In this case, the terminal 100 may respectively generate the message authentication keys for uplink and downlink, or may generate the same uplink and downlink message authentication keys.

Subsequently, the terminal 100 transmits an authorization key exchange request message to the base station 200 in step S105.

Table 2 shows parameters in the authorization key exchange request message according to the exemplary embodiment of the present invention.

TABLE 2

| Attribute | Contents |
| --- | --- |
| BS random | Random number included in an Authorization-Key-Exchange-Challenge message. This attribute may be encrypted. |
| SS random | Random number generated by an SS. This attribute may be encrypted. |
| Key sequence number | Key sequence number for new AK |
| AKID | AK identifier for new AK |
| Security-Capabilities | Security-related capabilities supported by an SS |
| CMAC-Digest | Message authentication digest calculated with authentication keys derived from new AK |

As shown in Table 2, the authorization key exchange request message includes a base station random value (BS Random), a terminal random value (SS Random), a key sequence number, an authorization key identifier (AKID), security capabilities, and a CMAC parameter (CMAC-Digest).

The base station random value that is randomly generated by the base station 200 is the same as the base station random value in the authorization-key-exchange-challenge message. In addition, the terminal 100 may encrypt the base station random value to transmit it.

The terminal random value is randomly generated by the terminal 100. Like the base station random value, the terminal 100 may encrypt the terminal random value to transmit it.

Here, the terminal 100 may use a newly generated authorization key or a predetermined key that is generated from the newly generated authorization key to encrypt the base station random value and the terminal random value.

The key sequence number that is a sequence number of the authorization key to identify the newly generated authorization key is the same value as a key sequence number corresponding to the temporary authorization key in the authorization-key-exchange-challenge message. In a like manner of the sequence number of the temporary authorization key, the authorization key sequence number is used to identify two authorization keys existing for a predetermined time when the authorization key is updated. In addition, since there may be two authorization keys for a predetermined time when the authorization key is updated, two message authentication keys may exist. Accordingly, a message authentication key sequence number for identifying the message authentication key is required, and the terminal 100 or the base station 200 may use the authorization key sequence number as the sequence number of the message authentication key.

The authorization key identifier is generated by using the authorization key that is generated by the terminal 100, the authorization key sequence number, the terminal MAC address, and the base station identifier, and is used to identify the authorization key. The terminal 100 and the base station 200 may generate the authorization key identifier, and the terminal 100 transmits the authorization key identifier to the base station to confirm that the base station 200 has the same authorization key identifier.

The security capabilities parameter shows security-related algorithms supported by the terminal 100, and the terminal 100 accepts the security capabilities parameter from the authorization key exchange request message when the base station 200 knows the security-related capabilities of the corresponding terminal 100. However, when base station 200 does not know the security-related capabilities of the corresponding terminal 100, an initial authentication procedure according to an initial access of the terminal 100 is successfully performed, and a security capabilities field is added to the authorization key exchange request message to initially generate the authorization key. When a re-authentication procedure between the terminal 100 and the base station 200 is successfully performed, since the base station 200 knows the security-related capabilities of the terminal through the initial authorization key generation procedure, the security capabilities field is excepted from the authorization key exchange request message that is included in the authorization key generation procedure performed in the re-authentication procedure.

The CMAC parameter (CMAC-Digest) is a parameter for authenticating the authorization key exchange request message. The terminal 100 applies parameters in the message authorization key exchange request message to a message hash function except for the CMAC parameter based on an uplink message authentication key that is generated from the authorization key generated by the terminal 100, and generates the CMAC parameter.

Referring back to FIG. 1, the base station 200 receiving the authorization key exchange request message uses the CMAC parameter in the authorization key exchange request message to authenticate the authorization key exchange request message. That is, in a like manner of the authentication method for the authorization-key-exchange-challenge message by the terminal 100, the base station 200 generates the CMAC parameter by using the received authorization key exchange request message. In addition, the base station 200 compares the generated CMAC parameter and the CMAC parameter in the authorization key exchange request message to authenticate the corresponding message.

When the authorization key exchange request message has failed to be authenticated, the base station 200 discards the corresponding message. However, when the message authentication is successful, the base station 200 uses the root key as the input key, and uses the base station random value, the terminal random value, the terminal MAC address, the base station identifier, and the predetermined string as the input data to generate an authorization key in step S106. In addition, a message authentication key is generated by using the generated authorization key. In this case, the base station 200 may separately generate message authentication keys for uplink and downlink, or may generate the same authorization keys for uplink and downlink.

Subsequently, the base station 200 transmits an authorization-key-exchange-response message to the terminal 100 in step S107.

Table 3 shows parameters in the authorization-key-exchange-response message according to the exemplary embodiment of the present invention.

TABLE 3

| Attribute | Contents |
| --- | --- |
| BS random | Random number included in an Authorization-Key-Exchange-Challenge message. This attribute may be encrypted. |
| SS random | Random number included in an Authorization-Key-Exchange-Request message. This attribute may be encrypted. |
| Key sequence number | Key sequence number for new AK |
| AKID | AK identifier for new AK |
| (one or more) SA-Descriptor(s) | Each compound SA-Descriptor attribute specifies an SA identifier and additional properties of the SA. |
| CMAC-Digest | Message authentication digest calculated with authentication keys derived from new AK |

As shown in Table 3, the authorization-key-exchange-response message includes the base station random value (BS Random), the terminal random value (SS Random), the key sequence number, the authorization key identifier (AKID), at least one security association (SA) descriptor, and the CMAC parameter (CMAC-Digest).

The base station random value is the same as the base station random value in the authorization-key-exchange-challenge message, and the terminal random value is the same as the terminal random value in the authorization key exchange request message. In this case, the base station 200 may encrypt the base station random value and the terminal random value to transmit them, and may use a newly generated authorization key or a predetermined key that is generated from the newly generated authorization key to encrypt the base station random value and the terminal random value.

The key sequence number is a sequence number for the authorization key, and is used to identify the authorization key.

The authorization key identifier is generated by the base station 200 by using the authorization key that is generated by the base station, the authorization key sequence number, the terminal MAC address, and the base station identifier, and is used to identify the authorization key. As described, the authorization key identifier is respectively generated by the terminal 100 and the base station 200, and the base station 200 transmits the authorization key identifier to the terminal 100 so as to confirm that the terminal 100 and the base station 200 have the same authorization key identifiers.

The SA descriptor includes SA information including an SA identifier (SAID), an SA type indicating a type of SA, an SA service type indicating a traffic service type mapped to the corresponding SA when the SA type is a dynamic SA or a static SA, and a cryptographic-suit indicating an encryption algorithm used for the corresponding SA. The base station 200 may define SA descriptors corresponding to the number of basic SAs and static SAs. In addition, an SA descriptor field is added to the authorization-key-exchange-response message in the initial authorization key generating procedure performed after the initial authentication procedure is successfully performed when the initial access of the terminal 100 is performed, but the SA descriptor parameter is excepted from the authorization-key-exchange-response message of the authorization key updating procedure performed after the re-authentication procedure is successfully performed between the terminal 100 and the base station 200.

The CMAC parameter (CMAC-Digest) is a parameter for authenticating the authorization-key-exchange-response message. The base station 200 applies parameters in the authorization-key-exchange-response message to a message hash function except for the CMAC parameter based on the downlink message authentication key that is generated from the authorization key generated by the base station 200 to generate the CMAC parameter.

In addition, the authorization-key-exchange-response message may additionally include security capabilities, and the security capabilities shows security-related algorithms supported by the terminal 200.

Referring back to FIG. 1, the terminal 100 receives the authorization-key-exchange-response message from the base station 200, and authenticates the received authorization-key-exchange-response message. When the authorization-key-exchange-response message is successfully authenticated, the authorization key generating procedure is performed, and the terminal 100 and the base station 200 communicate with each other by using a newly generated authorization key.

As described, in a method for generating the authorization key by using the base station random value that is randomly generated by the base station 200 and the terminal random value that is randomly generated by the terminal 100 as the input data, safety for the authorization key may be further increased.

An authorization key updating method according to the exemplary embodiment of the present invention will now be described with reference to FIG. 2.

Figure 2:
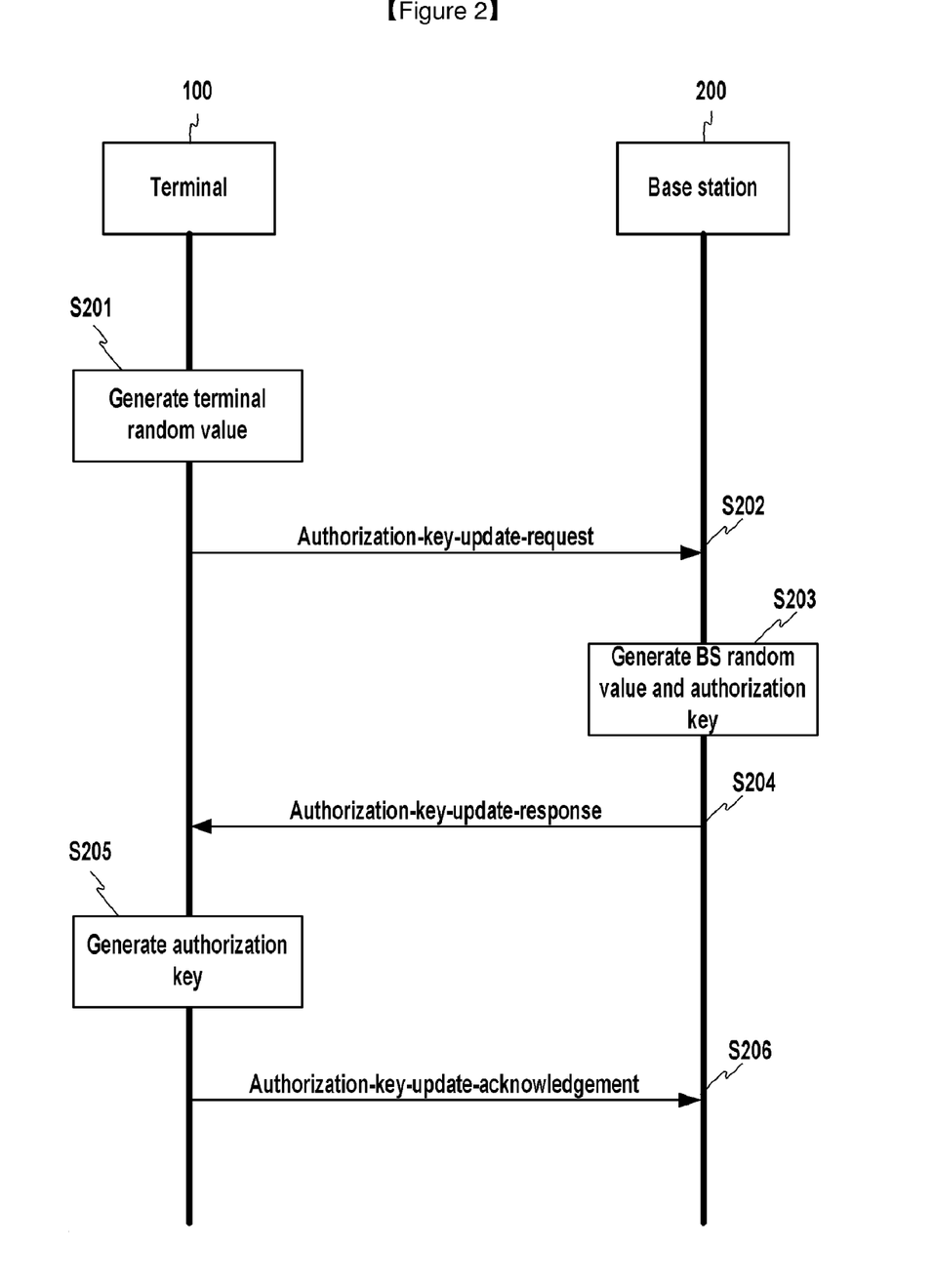
FIG. 2 is a flowchart representing an authorization key updating method according to the exemplary embodiment of the present invention.

FIG. 2 is a flowchart representing an authorization key updating method according to the exemplary embodiment of the present invention, in which the terminal 100 and the base station 200 periodically update an authorization key by using a root key.

As shown in FIG. 1, when the authorization key generating procedure that is firstly performed after the initial authentication procedure or the re-authentication procedure between the terminal 100 and the base station 200 is performed is successfully performed, the terminal 100 and the base station 200 share a root key, and share an authorization key that is generated based on the root key.

In the exemplary embodiment of the present invention, the terminal 100 and the base station 200 increase a lifetime of the root key so as to reduce wireless link resources used in the re-authentication procedure, and increase a re-authentication period. In addition, to continuously provide services and increase the safety of the authorization key, the lifetime of the authorization key is established to be shorter than the lifetime of the root key so as to reduce an authentication updating period.

Accordingly, the terminal 100 and the base station 200 perform an authorization key updating procedure shown in FIG. 2 in addition to the re-authentication procedure.

Referring to FIG. 2, before the lifetime of the authorization key has expired, the terminal 100 newly generates a terminal random value in step S201, and transmits an authorization-key-update-request message including the terminal random value to the base station 200 in step S202.

Table 4 shows parameters in the authorization-key-update-request message according to the exemplary embodiment of the present invention.

TABLE 4

| Attribute | Contents |
|---|---|
| SS random | Random number generated by an SS. This attribute may be encrypted. |
| Key sequence number | Key sequence number for current AK |
| AKID | AK identifier for current AK |
| CMAC-Digest | Message authentication digest calculated with authentication keys derived from old AK |

As shown in Table 4, the authorization-key-update-request message includes a terminal random value (SS Random), a key sequence number, an authorization key identifier (AKID), and a CMAC parameter (CMAC-Digest).

The terminal random value is a random value that is newly generated by the terminal 100, and the terminal 100 may encrypt the terminal random value to transmit it. In this case, the terminal 100 may use the currently used authorization key or a predetermined key that is generated by the currently used authorization key to encrypt the terminal random value.

The key sequence number is a sequence number for the authorization key that is shared by the terminal 100 and the base station 200 (i.e., the authorization key before the update).

The authorization key identifier is an identifier for the authorization key that is currently shared by the terminal 100 and the base station 200.

The CMAC parameter is used to authenticate the authorization-key-update-request message. The terminal 100 applies parameters in the authorization-key-update-request message to a message hash function by using the uplink message authentication key to generate the CMAC parameter. In this case, the message authentication key is generated based on the authorization key that is currently shared by the terminal 100 and the base station 200. In addition, since there may be two authorization keys for a predetermined time while the authorization key is updated and there may be a plurality of message authentication keys, the terminal 100 or the base station 200 uses the message authentication key sequence number to identify the respective message authentication keys. In this case, the terminal 100 or the base station 200 may use a sequence number of the authorization key as the message authentication key sequence number.

Referring back to FIG. 2, the base station 200 receiving the authorization-key-update-request message from the terminal 100 uses the CMAC parameter in the received authorization-key-update-request message to perform message authentication, and discards the corresponding message when the message authentication has failed. In this case, the base station 200 uses the uplink message authentication key that is generated based on the authorization key that is currently shared by the terminal 100 and the base station 200 to authenticate the authorization-key-update-request message.

When the message authentication has succeeded, the base station 200 newly generates a base station random value (BS Random) to update the authorization key. In addition, the base station 200 uses a root key allocated to the corresponding terminal 100 as an input key, and uses the terminal random value in the authorization-key-update-request message, the base station random value that is newly generated by the base station 200, the terminal MAC address, the base station identifier, and the predetermined string as input data to generate a new authorization key in step S203. Further, a new message authentication key is generated by using the newly generated authorization key.

When the new authorization key is generated, the base station 200 transmits an authorization-key-update-response message to the corresponding terminal 100 in step S204.

Table 5 shows parameters in the authorization-key-update-response message according to the exemplary embodiment of the present invention.

TABLE 5

| Attribute | Contents |
| --- | --- |
| BS random | Random number generated by a BS. This attribute may be encrypted. |
| SS random | Random number included in an Authorization-Key-Update-Request message. This attribute may be encrypted. |
| Key lifetime | Key lifetime for new AK |
| Key sequence number | Key sequence number for new AK |
| AKID | AK identifier for new AK |
| CMAC-Digest | Message authentication digest calculated with authentication keys derived from new AK |

As shown in Table 5, the authorization-key-update-response message includes a base station random value (BS Random), a terminal random value (SS Random), a key lifetime, a key sequence number, an authorization key identifier (AKID), and a CMAC parameter (CMAC-Digest).

The base station random value is randomly generated by the base station 200 to update an authorization key, and the base station 200 may encrypt the base station random value to transmit it.

The terminal random value is the same as the terminal random value in the authorization-key-update-request message, and the terminal random value may also be encrypted to be transmitted.

Here, the base station 200 may use a newly generated authorization key or a predetermined key that is generated by the newly generated authorization key to encrypt the base station random value and the terminal random value.

The key lifetime indicates a lifetime of the newly generated authorization key (i.e., a period for updating the authorization key).

The key sequence number is a sequence number for the newly generated authorization key, and the base station 200 generates a new key sequence number that is different from the sequence number of the authorization key that is currently used by the terminal 100 and the base station 200, and uses the new key sequence number as the sequence number of the newly generated authorization key. That is, the key sequence number in the authorization-key-update-request message is different from the key sequence number in the authorization-key-update-response message.

The authorization key identifier is an identifier for the newly generated authorization key.

The CMAC parameter is used to authenticate the authorization-key-update-response message. In addition, the base station 200 uses a downlink message authentication key that is generated based on the newly generated authorization key to generate the CMAC parameter.

Referring back to FIG. 2, the terminal 100 receiving the authorization-key-update-response message from the base station 200 uses the CAMC parameter in the received authorization-key-update-response message to perform message authentication, and discards the corresponding message when the authentication has failed. Here, the terminal 100 uses the downlink message authentication key that is generated based on the authorization key newly shared by the terminal 100 and the base station 200 to authenticate the authorization-key-update-response message.

When the message authentication has succeeded, the terminal 100 uses a root key allocated to the terminal 100 as an input key, and uses the terminal random value in the authorization-key-update-request message, the base station random value in the authorization-key-update-response message, the terminal MAC address, the base station identifier, and the predetermined string as input data to generate a new authorization key in step S205. In addition, the terminal 100 generates a new message authentication key based on the generated authorization key, and transmits an authorization-key-update-acknowledgement message to the base station 200.

Table 6 shows parameters in the authorization-key-update-acknowledgement message according to the exemplary embodiment of the present invention.

TABLE 6

| Attribute | Contents |
| --- | --- |
| BS random | Random number included in an Authorization-Key-Update-Response message. This attribute may be encrypted. |
| SS random | Random number included in an Authorization-Key-Update-Request message. This attribute may be encrypted. |
| Key sequence number | Key sequence number for new AK |
| AKID | AK identifier for new AK |
| CMAC-Digest | Message authentication digest calculated with authentication keys derived from new AK |

As shown in Table 6, the authorization-key-update-acknowledgement message includes a base station random value (BS Random), a terminal random value (SS Random), a key sequence number, an authorization key identifier (AKID), and a CMAC parameter (CMAC-Digest).

The base station random value is the same as the base station random value in the authorization-key-update-response message.

The terminal random value is the same as the terminal random value in the authorization-key-update-request message.

In addition, the base station random value and the terminal random value may be encrypted to be transmitted, and the terminal 100 may use a newly generated authorization key or a predetermined key that is generated by the newly generated authorization key to encrypt the base station random value and the terminal random value.

The key sequence number is a sequence number of the newly generated authorization key, and is the same as the key sequence number in the authorization-key-update-response message.

The authorization key identifier is an identifier for the newly generated authorization key.

The CMAC parameter is used to authenticate the authorization-key-update-acknowledgement message, and is generated by using an uplink message authentication key that is generated based on the newly generated authorization key.

Referring back to FIG. 2, the base station 200 receiving the authorization-key-update-acknowledgement message authenticates the corresponding message, and discards the corresponding message when the message authentication has failed. Here, the base station 200 uses the uplink message authentication key that is generated based on the authorization key that is newly shared by the terminal 100 and the base station 200 to authenticate the authorization-key-update-acknowledgement message.

When the message authentication has succeeded, the base station 200 acknowledges that the terminal newly generates an authorization key that is the same as the authorization key that is newly generated by the base station 200, and successfully performs the authorization key updating procedure. Subsequently, the terminal 100 and the base station 200 share and use the newly generated authorization key rather than using the previous authorization key, and use a newly updated authorization key so as to safely transmit and received data.

As described, since the lifetime of the authorization key and the lifetime of the root key are differently established, the safety of the authorization key may be increased, and the wireless link resources may be efficiently used.

The above-described methods and apparatuses are not only realized by the exemplary embodiment of the present invention, but, on the contrary, are intended to be realized by a program for realizing functions corresponding to the configuration of the exemplary embodiment of the present invention or a recording medium for recording the program.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. An authorization key generating method of a base station, comprising:
   obtaining a root key in an authentication procedure with a terminal;
   generating a base station random value;
   transmitting a first message including the base station random value to the terminal;
   receiving a second message including a terminal random value from the terminal;
   generating an authorization key by using the root key, the base station random value, and the terminal random value;
   transmitting a third message including a message authentication parameter that is generated by using a message authorization key corresponding to the authorization key to the terminal;
   generating a temporary authorization key by using the root key and the base station random value;
   generating a temporary message authentication key based on the temporary authorization key; and
   generating the message authentication parameter included in the first message by using the temporary message authentication key;
   wherein the lifetime of the authorization key is shorter than the lifetime of the root key.

2. The authorization key generating method of claim 1, wherein the transmitting of the first message to the terminal comprises encrypting the base station random value by using the temporary authorization key and adding the encrypted base station random value to the first message.

3. The authorization key generating method of claim 1, further comprising encrypting the base station random value by using the key generated from the temporary authorization key, and adding the encrypted base station random value to the first message.

4. The authorization key generating method of claim 1, wherein the first message comprises a sequence number used to identify both the temporary authorization key and the authorization key.

5. The authorization key generating method of claim 1, wherein the first message comprises a lifetime corresponding to a period for updating the authorization key.

6. The authorization key generating method of claim 1, wherein the second message comprises a first parameter that is the message authentication parameter and at least one of second parameters, and the authorization key generating method further comprises:
   generating a third parameter that is the message authentication parameter by using the at least one second parameter; and
   authenticating the second message by comparing the first parameter and the third parameter.

7. The authorization key updating method of claim 1 further comprising:
   updating the authorization key before the lifetime of the authorization key has expired.

8. An authorization key generating method of a terminal, the authorization key generating method comprising:
   obtaining a root key by performing an authentication procedure with a base station;
   receiving a first message including a base station random value from the base station; generating a terminal random value;
   generating an authorization key by using the root key, the base station random value, and the terminal random value;
   transmitting a second message including the terminal random value to the base station;
   receiving a third message that is a response to the second message;
   generating a temporary authorization key by using the root key and the terminal random value;
   generating a temporary message authentication key based on the temporary authorization key; and
   generating the message authentication parameter included in the first message by using the temporary message authentication key;
   wherein the lifetime of the authorization key is shorter than the lifetime of the root key.

9. The authorization key generating method of claim 8, further comprising performing message authentication for the first message,
   wherein, in the generating of the authorization key, the authorization key is generated when the message authentication is successfully performed.

10. The authorization key generating method of claim 9, wherein the performing of the message authentication comprises:
    generating a temporary authorization key by using the root key as an input key and using at least one among the base station random value in the first message, a terminal media access control (MAC) address, a base station identifier, and a predetermined string;
    generating a temporary message authentication key based on the temporary authorization key;

generating a cipher-based message authentication code parameter by using the temporary message authentication key; and performing the message authentication by comparing the cipher-based message authentication code parameter and a cipher-based message authentication code parameter in the first message.

11. The authorization key generating method of claim 8, wherein the transmitting of the second message to the base station further comprises encrypting the terminal random value by using the authorization key, and adding the encrypted terminal random value to the second message.

12. The authorization key generating method of claim 8, wherein the transmitting of the second message to the base station further comprises encrypting the terminal random value by using at least one of keys that are generated from the authorization key, and adding the encrypted terminal random value to the second message.

13. The authorization key generating method of claim 8, wherein the transmitting of the second message to the base station comprises:

generating a message authorization key based on the authorization key;

generating a message authentication parameter by using the message authorization key; and adding the message authentication parameter to the second message.

14. The authorization key updating method of claim 8 further comprising:

updating the authorization key before the lifetime of the authorization key has expired.

* * * * *